(12) United States Patent
Takahashi et al.

(10) Patent No.: US 10,545,292 B2
(45) Date of Patent: Jan. 28, 2020

(54) OPTICAL WAVEGUIDE CIRCUIT DEVICE

(71) Applicant: FURUKAWA ELECTRIC CO., LTD., Tokyo (JP)

(72) Inventors: Masanori Takahashi, Tokyo (JP); Yasuyoshi Uchida, Tokyo (JP); Shintaro Yamasaki, Tokyo (JP); Junichi Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/145,489

(22) Filed: Sep. 28, 2018

(65) Prior Publication Data

US 2019/0033530 A1 Jan. 31, 2019

Related U.S. Application Data

(63) Continuation of application No. PCT/JP2017/010077, filed on Mar. 14, 2017.

(30) Foreign Application Priority Data

Mar. 31, 2016 (JP) .................................. 2016-070091

(51) Int. Cl.
*G02B 6/35* (2006.01)
*G02B 6/293* (2006.01)

(52) U.S. Cl.
CPC ....... *G02B 6/3588* (2013.01); *G02B 6/29355* (2013.01); *G02B 6/356* (2013.01)

(58) Field of Classification Search
CPC .. G02B 6/3588; G02B 6/29355; G02B 6/356; G02B 6/125; G02B 6/43; G02B 6/12; G02F 1/313
See application file for complete search history.

(56) References Cited

U.S. PATENT DOCUMENTS 5,881,199 A * 3/1999 Li ...................... G02B 6/12016
                                                            385/14
5,892,864 A * 4/1999 Stoll ...................... G02F 1/313
                                                            385/17

(Continued)

FOREIGN PATENT DOCUMENTS

JP 2001-147335 5/2001
JP 2004-037783 2/2004

(Continued)

OTHER PUBLICATIONS

International Search Report dated May 30, 2017 in PCT/JP2017/010077 filed Mar. 14, 2017 (with English Translation).

(Continued)

*Primary Examiner* — Thomas A Hollweg
*Assistant Examiner* — Mary A El-Shammaa
(74) *Attorney, Agent, or Firm* — Oblon, McClelland, Maier & Neustadt, L.L.P.

(57) ABSTRACT

An optical waveguide circuit device includes: an optical waveguide circuit including a cladding layer formed on a substrate and made from silica-based glass, and an optical waveguide formed within the cladding layer and made from silica-based glass; heaters formed over the cladding layer and the optical waveguide and configured to heat the optical waveguide; wiring line electrode layers formed over the cladding layer, each of the wiring line electrode layers being coupled to a corresponding heater of the heaters and configured to allow electrical power to be supplied to the coupled heater; and an insulating layer covering the cladding layer, the heaters, and the wiring line electrode layers. The wiring line electrode layers adjacent to each other in a plan view are formed in different wiring layers. The wiring line electrode layers adjacent to each other in the same wiring layer are spaced by at least a predetermined distance.

5 Claims, 12 Drawing Sheets

(56) References Cited

U.S. PATENT DOCUMENTS

| | | | |
|---|---|---|---|
| 6,233,378 B1 | 5/2001 | Sun | |
| 8,615,146 B2* | 12/2013 | Nagano | G02B 6/12007 |
| | | | 385/14 |
| 8,625,943 B2* | 1/2014 | Soma | G02B 6/12019 |
| | | | 385/139 |
| 9,941,957 B2* | 4/2018 | Sahni | H04B 10/40 |
| 2004/0062506 A1 | 4/2004 | Komura et al. | |
| 2004/0223677 A1* | 11/2004 | Park | G02B 6/1221 |
| | | | 385/1 |
| 2007/0104409 A1* | 5/2007 | Nara | G02B 6/12007 |
| | | | 385/14 |
| 2010/0183302 A1* | 7/2010 | Lamvik | G02B 6/1221 |
| | | | 398/45 |
| 2011/0064355 A1* | 3/2011 | Soma | G02B 6/12019 |
| | | | 385/14 |
| 2011/0274388 A1* | 11/2011 | Yamamoto | G02B 6/43 |
| | | | 385/14 |
| 2012/0251041 A1* | 10/2012 | Ishikawa | G02B 6/12019 |
| | | | 385/14 |
| 2014/0050242 A1* | 2/2014 | Taylor | H01L 29/0688 |
| | | | 372/45.012 |
| 2014/0241683 A1 | 8/2014 | Uchida et al. | |
| 2016/0025930 A1* | 1/2016 | Hasegawa | G02F 1/3137 |
| | | | 385/17 |
| 2016/0246001 A1 | 8/2016 | Uchida et al. | |

FOREIGN PATENT DOCUMENTS

| | | |
|---|---|---|
| JP | 2008-233471 | 10/2008 |
| JP | 2013-210623 | 10/2013 |
| JP | 2015-075588 | 4/2015 |

OTHER PUBLICATIONS

Written Opinion dated May 30, 2017 in PCT/JP2017/010077 filed Mar. 14, 2017.

Masanori Takahashi, et al., "Compact and Low-Loss Coherent Mixer Based on High Δ $ZrO_2$—$SiO_2$ PLC," Journal of Lightwave Technology, vol. 32, No. 17, Sep. 2014, pp. 3081-3088.

* cited by examiner

OPTICAL WAVEGUIDE CIRCUIT DEVICE

CROSS-REFERENCE TO RELATED APPLICATIONS

This application is a continuation of international Application no. PCT/JP2017/010077, filed on Mar. 14, 2017 which claims the benefit of priority of the prior Japanese patent Application no. 2016-070091, filed on Mar. 31, 2016, the entire contents of which are incorporated herein by reference.

BACKGROUND

The present disclosure relates to an optical waveguide circuit device.

Known optical switches that are used in optical communication include optical waveguide circuit devices including a Planar Lightwave Circuit (PLC) made of silica-based glass. There is a disclosed technology in which, for optical waveguides constituting the PLC, zirconia ($ZrO_2$) is used as a dopant for increasing the refractive index (see JP 2013-210623 A). $ZrO_2$ is a material having a high refractive index and a low coefficient of thermal expansion, as compared with germania ($GeO_2$). The use of $ZrO_2$ as a dopant makes it possible to achieve a significantly increased relative refractive index difference $\Delta$ of the core (optical waveguides) to the cladding layer, as compared with PLCs in which $GeO_2$ is used as a dopant. Consequently, the minimum bend radius allowable for the optical waveguides is reduced, and thus a miniaturization, cost reduction, and dense integration of PLCs can be expected. Hence, $ZrO_2$ is expected to serve as a material capable of achieving miniaturized PLCs and optical waveguide circuit devices using a PLC and also reduced stress remaining in the optical waveguides.

SUMMARY

In optical waveguide circuit devices utilizing the Thermo-Optic (TO) effect, heaters and wiring line electrode layers are layered over the PLC cladding layer. The heaters are used to heat the optical waveguides and change their refractive index. The wiring line electrode layers constitute a pattern of wiring lines for providing electrical power to the heaters.

When the number of heaters is increased to enhance the functionality of the optical waveguide circuit device, the number of wiring line electrode layers is accordingly increased and the increasing rate is greater than that in the number of heaters. Thus, there is a problem in that, in an optical waveguide circuit device, even in a case where the region where optical waveguides are formed in the PLC (optical waveguide formation region) is miniaturized to miniaturize the size of the PLC, the size of the region where wiring line electrode layers are formed (wiring line electrode layer formation region) limits the miniaturization of the chip size of the optical waveguide circuit device. The wiring line electrode layer formation region can be made small by reducing the width of the wiring line electrode layers. However, a reduced width of the wiring line electrode layers results in decreases in the allowable current and allowable applied voltage of the wiring line electrode layers, which may not supply necessary electrical power to the heaters. In addition, the wiring line electrode layer formation region can be made small by reducing the spacing between adjacent wiring line electrode layers. However, this results in an increase in required precision for the process of manufacturing the wiring line electrode layers and consequently in a decrease in manufacturability.

There is a need for a downsized optical waveguide circuit device.

An optical waveguide circuit device according to one aspect of the present disclosure includes: an optical waveguide circuit including a cladding layer formed on a substrate and made from silica-based glass, and an optical waveguide formed within the cladding layer and made from silica-based glass; a plurality of heaters formed over the cladding layer and over the optical waveguide and configured to heat the optical waveguide; a plurality of wiring line electrode layers formed over the cladding layer, each of the plurality of wiring line electrode layers being coupled to a corresponding heater of the plurality of heaters and configured to allow electrical power to be supplied to the heater that is coupled; and an insulating layer covering the cladding layer, the plurality of heaters, and the plurality of wiring line electrode layers, wherein the plurality of wiring line electrode layers are formed in any of a plurality of wiring layers having distances from the substrate different from one another, wiring line electrode layers of the plurality of wiring line electrode layers adjacent to each other in a plan view are each formed in different wiring layers of the plurality of wiring layers, and wiring line electrode layers of the plurality of wiring line electrode layers adjacent to each other in the same wiring layer of the plurality of wiring layers are spaced by at least a predetermined distance.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
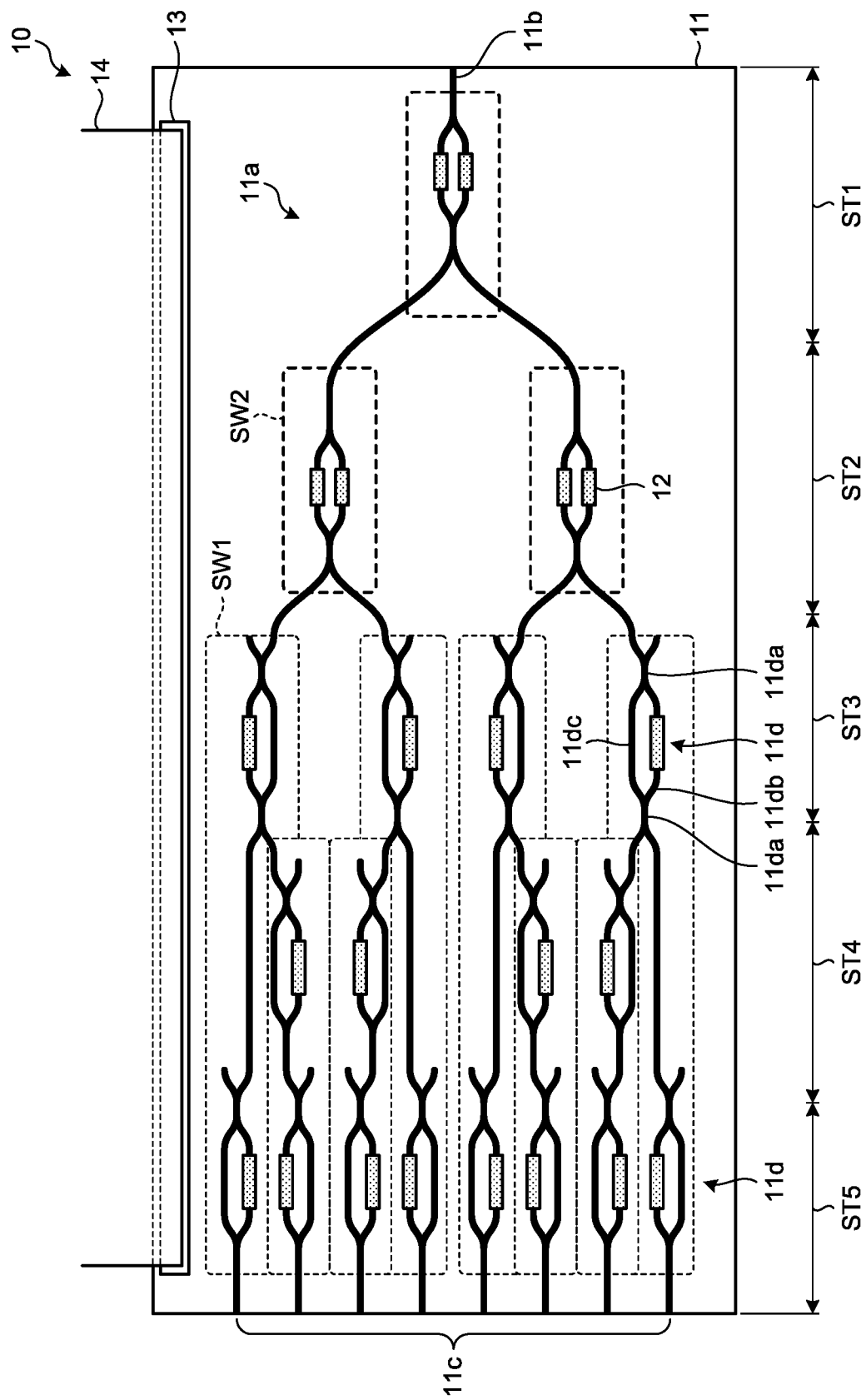
FIG. 1 is a schematic configuration diagram of an optical waveguide circuit device according to a first embodiment.

Embodiments of an optical waveguide circuit device according to the present disclosure will be described in detail below with reference to drawings. Note that the disclosure is not limited to the embodiments. In addition, in the drawings, the same or corresponding elements are indicated by the same reference character as appropriate. Furthermore, note that the drawings are schematically illustrated and thus that, for example, the dimensional relationship between elements may be different from the actual dimensional relationship. In the drawings, there may be one or more portions in which the dimensional relationship or the scale is different from that in a different drawing.

First Embodiment

FIG. 1 is a schematic configuration diagram of an optical switch device that is an optical waveguide circuit device according to a first embodiment. The optical switch device 10 includes a PLC 11, a plurality of heaters 12, an electrode pad region 13, and wiring boards 14. The PLC 11 is an optical waveguide circuit. The PLC 11 includes an optical switch circuit 11a formed therein, and the optical switch circuit 11a functions as a 1×8 optical switch circuit. The optical switch circuit 11a includes a common port 11b, eight branch ports 11c, and a plurality of Mach-Zehnder interferometers (MZIs) 11d coupled in cascade form.

Each of the MZIs 11d includes two couplers 11da (in the first embodiment, multi-mode interference (MMI) couplers) and two arm waveguides 11db and 11dc coupling the two couplers 11da together. Note that the couplers of the MZI 11d may not necessarily be MMI couplers. Instead, couplers, such as directional couplers (DCs), wavelength insensitive couplers (WINCs), or Y-branch couplers, may be used depending on the characteristics.

In the optical switch circuit 11a, one MZI 11d is provided in a first stage ST1 as seen from the common port 11b, and two MZIs 11d are provided in a second stage ST2. Output ports of the two MZIs 11d in the second stage ST2 are coupled to two respective input ports of the MZI 11d in the first stage ST1. Four MZIs 11d are provided in a third stage ST3. Input ports of the two MZIs 11d, four input ports in total, in the second stage ST2 are coupled to respective output ports of the four respective MZIs 11d in the third stage ST3. Four MZIs 11d are provided in a fourth stage ST4, and eight MZIs 11d are provided in a fifth stage ST5. Input ports of the four MZIs 11d, eight input ports in total, in the third stage ST3 are each coupled to an output port of a corresponding one of the four MZIs 11d in the fourth stage ST4 or an output port of a corresponding one of four of the MZIs 11d in the fifth stage ST5. Four input ports of the four MZIs 11d in the fourth stage ST4 are coupled to respective output ports of the remaining four respective MZIs 11d in the fifth stage ST5.

Note that of all the MZIs 11d, switches SW1, which are surrounded by the dotted lines, constitute a gate switch, and switches SW2 constitute a 2×1 switch. In each of the switches SW1, the heater 12 is provided for one of the two arm waveguides 11db and 11dc of the MZI 11d. In each of the switches SW2, the heater 12 is provided for each of the two arm waveguides 11db and 11dc. Thus, a total of twenty-two heaters 12 are provided.

When heating by the heaters 12 is not being performed, light signals input from one of the two input ports of the MZI 11d are adjusted to be output from one of the two output ports, regarding MZIs 11d constituting the switches SW1, and are adjusted to be output to two output ports at a branching ratio of 1:1, regarding MZIs 11d constituting the switches SW2. When one of the two arm waveguides 11db, 11dc is heated by the heater 12, the propagation velocity of light in the waveguide decreases, which changes an output state of the light signals such that the light signals are output from the other of the two output ports. Thus, the output port, of the two output ports, from which light signals input from the input port are to be output can be selected by controlling the on and off of the heating of the heater 12. The heaters 12 are coupled to electrode pads in the electrode pad region 13 with wiring line electrode layers (not illustrated in FIG. 1). A controller (not illustrated) controls electric power supply to the heaters 12 via the wiring boards 14, the electrode pads, and the wiring line electrode layers. This allows switching whether or not the heaters 12 are heated. This configuration allows the route over which light signals are to travel in the optical switch circuit 11a to be dynamically changed. Note that the wiring boards 14 include, for example, flexible printed circuits.

Furthermore, the two-stage-configuration gate switch formed in the switch SW1 can achieve high extinction ratio of the optical switch circuit 11a even when the heaters 12 are not energized.

Figure 2A:
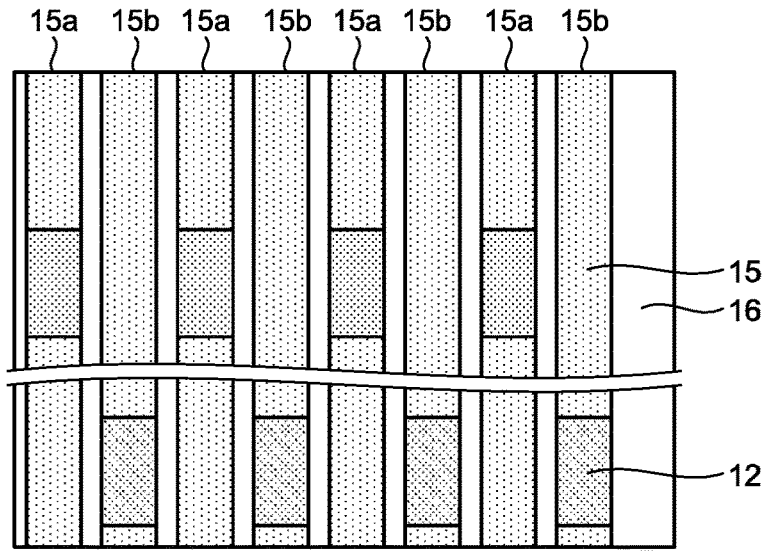
FIG. 2A is a schematic partial plan view of an optical waveguide circuit device according to the first embodiment.
Figure 2B:
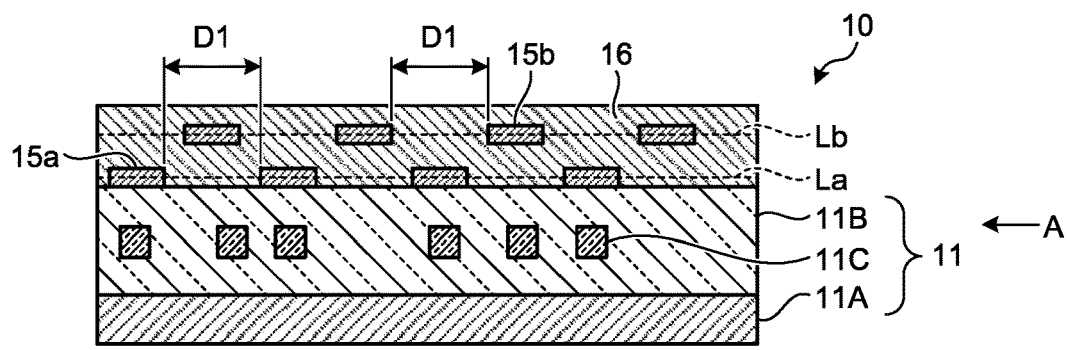
FIG. 2B is a partial cross-sectional view of an optical waveguide circuit device according to the first embodiment, taken along a plane perpendicular to a major surface of a substrate of a PLC.
Figure 2C:
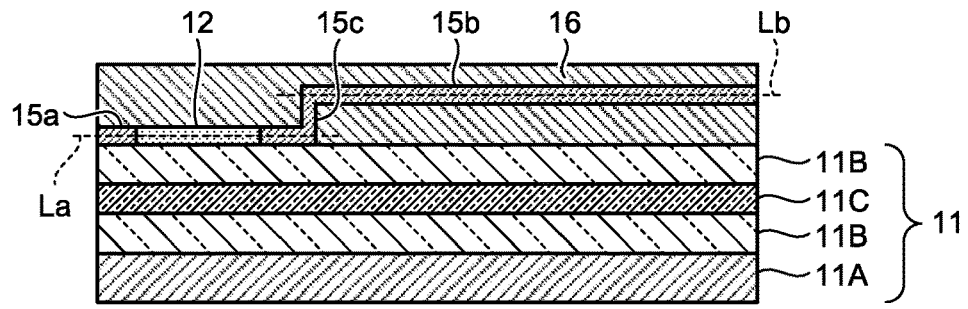
FIG. 2C is a schematic view of the optical waveguide circuit device illustrated in FIG. 2B, as viewed in the direction of an arrow A.
Figure 3:
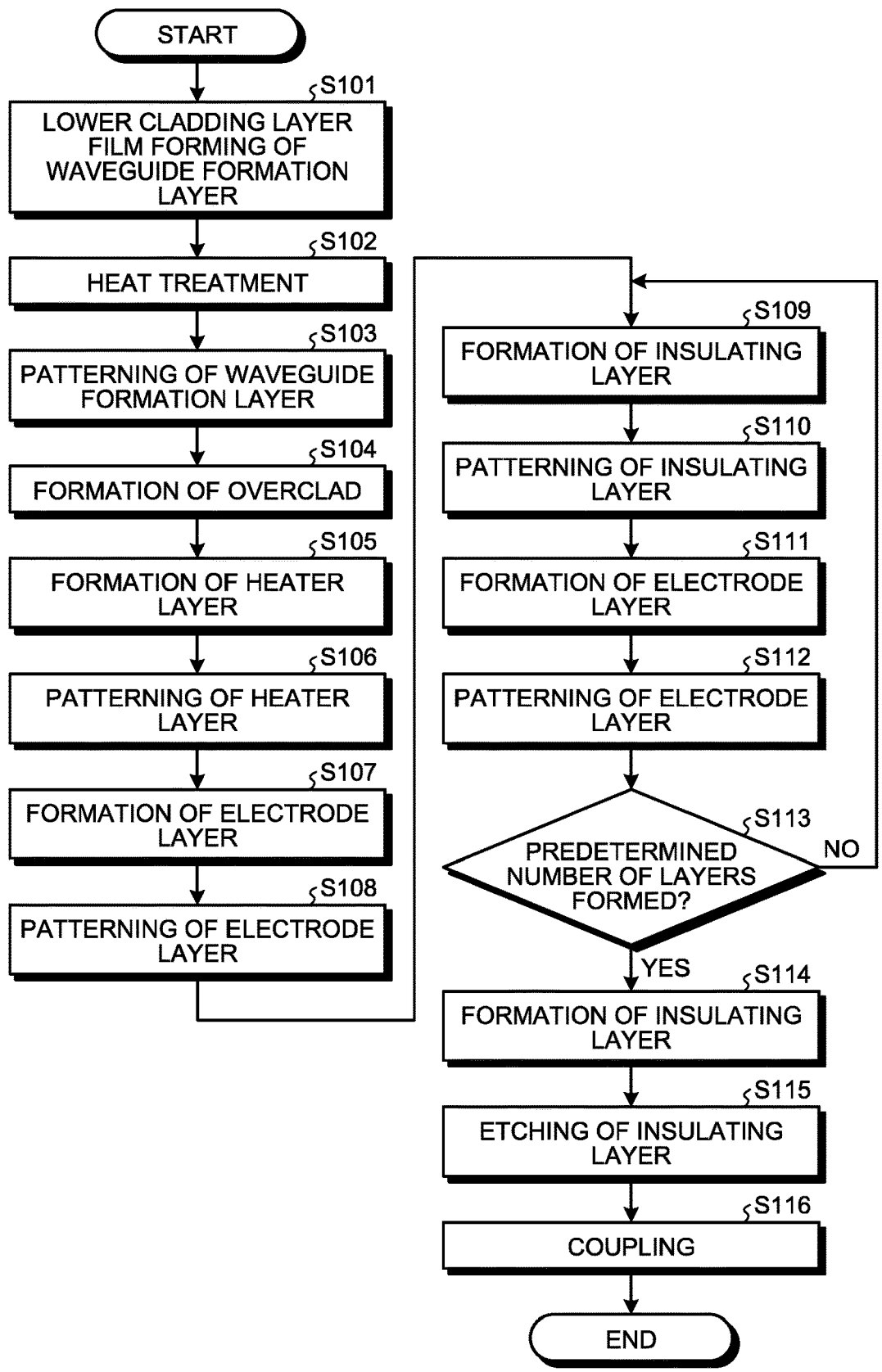
FIG. 3 is an example of a flowchart of a method for manufacturing an optical waveguide circuit device according to the first embodiment.

Next, a more specific configuration of the optical switch device 10 will be described with reference to FIGS. 2A to 2C. FIGS. 2A to 2C are views illustrating a more specific configuration of the optical switch device 10 that is an optical waveguide circuit device according to the first embodiment. FIG. 2A is a schematic partial plan view of the optical switch device 10, FIG. 2B is a partial cross-sectional view of the optical switch device 10, taken along a plane perpendicular to a major surface of the substrate of the PLC, and FIG. 2C is a schematic view, as viewed in the direction of an arrow A in FIG. 2B.

The PLC 11 includes a cladding layer 11B and a plurality of optical waveguides 11C. The cladding layer 11B is formed on a major surface of a substrate 11A and made from silica-based glass. The substrate 11A is made from silicon or silica glass. The plurality of optical waveguides 11C are formed within the cladding layer 11B and made from silica-based glass.

The optical waveguides 11C is made from silica-based glass doped with zirconia ($ZrO_2$) that is a dopant that increases the refractive index. This allows the optical waveguides 11C to have a greater refractive index than that of the cladding layer 11B, function as optical waveguides for confining and guiding light, and form the common port 11b, the branch ports 11c, and the MZIs 11d of the optical switch circuit 11a. The optical waveguides 11C have a relative refractive index difference Δ with respect to the cladding layer 11B of, for example, from 3% to 10% and have a cross-sectional size of from 1.0 μm×1.0 μm to 5.0 μm×5.0 μm. It is more preferable that the relative refractive index difference Δ be from 5% to 10% and the cross-sectional sizes be from 1.0 μm×1.0 μm to 3.5 μm×3.5 μm. A cross section of the optical waveguide 11C basically has a square shape but instead may have a rectangular shape or a trapezoidal shape.

Since the optical waveguides 11C include $ZrO_2$, the optical waveguides 11C have a high refractive index compared with the case where $GeO_2$ is used as a dopant for increasing the refractive index. The relative refractive index difference Δ of the optical waveguides 11C to the cladding layer 11B may be made to be, for example, from 3% to 10% by adjusting the content of $ZrO_2$. In contrast, a relative refractive index difference Δ of optical waveguides using $GeO_2$ is typically less than 1.5% and, at most, approximately 2.5%. In optical interference elements, such as the MZIs 11d, in the PLC 11, the waveguide length necessary for generating desired optical interference decreases in proportion to increasing refractive index. As a result, the MZIs 11d whose optical waveguides 11C include $ZrO_2$ and the PLC 11 including the MZIs 11d can have a reduced size.

Each of the plurality of (twenty-two in the first embodiment) heaters 12 is formed over the cladding layer 11B and over an optical waveguide 11C to be heated. In the first embodiment, the heaters 12 are formed directly on the cladding layer 11B.

A plurality of (forty-four in the first embodiment) wiring line electrode layers 15 are formed over the cladding layer 11B. Each of the plurality of wiring line electrode layers 15 is coupled to a corresponding one of the two ends of a corresponding one of the plurality of heaters 12 to allow electrical power for heating the coupled heater 12 to be supplied. The heaters 12 are made from, for example, a material such as TaN, and the wiring line electrode layers 15 are made from, for example, a material such as gold (Au).

An insulating layer 16 is made from, for example, $SiO_2$ and covers the cladding layer 11B, the heaters 12, and the wiring line electrode layers 15. Each of the wiring line electrode layers 15 is formed in one of two wiring layers La and Lb having distances from the substrate 11A (distances from the major surface) different from each other. Specifically, the wiring layer Lb is located farther from the substrate 11A than the wiring layer La. Wiring line electrode layers 15a formed in the wiring layer La are formed directly on the cladding layer 11B. The front surface and the side surfaces of the wiring line electrode layers 15a are covered by the insulating layer 16. On the other hand, wiring line electrode layers 15b formed in the wiring layer Lb include the outer surfaces covered by the insulating layer 16.

Note that since the heaters 12 are formed directly on the cladding layer 11B as described above, the wiring line electrode layers 15b formed in the wiring layer Lb needs to be coupled to the wiring line electrode layers 15a formed in the wiring layer La with wiring line electrode layers 15c therebetween.

In addition, as illustrated in FIG. 2A, the wiring line electrode layers 15a and 15b are adjacent to one another in a plan view and are formed in the different respective wiring layers La, Lb (see FIGS. 2B and 2C). As illustrated in FIG. 2B, in either one of the wiring layers, for example, in the wiring layer Lb, the spacing between adjacent wiring line electrode layers 15b is D1, and D1 is greater than or equal to a predetermined distance D0 determined in accordance with the processing precision of the manufacturing process. Note that the PLC 11 can be minimized with decreasing D0. However, because of the limitation due to the processing precision of the manufacturing process, D0 is 70 μm or greater and more preferably 100 μm or greater. Likewise, in the wiring layer La, the spacing between adjacent wiring line electrode layers 15a is D1, and D1 is greater than or equal to the predetermined distance D0. The width of the wiring line electrode layers 15a and 15b is set in accordance with the amount of electrical power to be supplied and is greater than or equal to a predetermined size that allows a supply of desired electrical power. The width of the wiring line electrode layers 15a and 15b is preferably not less than 30 μm and more preferably not less than 100 μm. The smaller the width of the wiring line electrode layers 15a and 15b, the more advantageous for miniaturization of the chip size. Thus, the width is preferably not greater than 500 μm and more preferably not greater than 100 μm.

As described above, the wiring line electrode layers 15a and 15b formed in the different respective wiring layers La and Lb are adjacent to one another in a plan view. Further, in either the wiring layer La or the wiring layer Lb, the spacing between adjacent wiring line electrode layers 15a or between adjacent wiring line electrode layers 15b is greater than or equal to a predetermined distance. As a result, the wiring line electrode layers 15 are densely arranged without reducing the width of the wiring line electrode layers or reducing the spacing between adjacent wiring line electrode layers. In addition, since the wiring line electrode layers 15a and 15b are formed respectively in the different wiring layers La and Lb, the wiring line electrode layers 15a and the wiring line electrode layers 15b can be crossed three-dimensionally so that the size of the wiring line electrode layer formation region can be reduced. This allows the size of the wiring line electrode layer formation region to be miniaturized while ensuring the amount of electrical power supplied and manufacturability, and thus a downsized optical switch device 10 can be achieved.

Next, an example of a method for manufacturing the optical switch device 10 will be described with reference to the flowchart of FIG. 3 and FIGS. 4A to 4D. FIGS. 4A to 4D are views illustrating an example of a method for manufacturing the optical switch device 10 that is an optical waveguide circuit device according to the first embodiment.

First, in step S101, a film of a lower cladding layer 11BA is formed on the substrate 11A by using, for example, plasma Chemical Vapor Deposition (CVD), and a film of an optical waveguide formation layer 11D, which is used to form the optical waveguides 11C, is formed on the lower cladding layer 11BA by sputtering (see FIG. 4). Note that a thermal oxide film formed by thermally oxidizing the substrate 11A may serve as the lower cladding layer 11BA or the lower cladding layer 11BA may be produced by Flame Hydrolysis Deposition (FHD).

Next, in step S102, the lower cladding layer 11BA and the optical waveguide formation layer 11D are subjected to heat treatment for annealing.

Figure 4A:
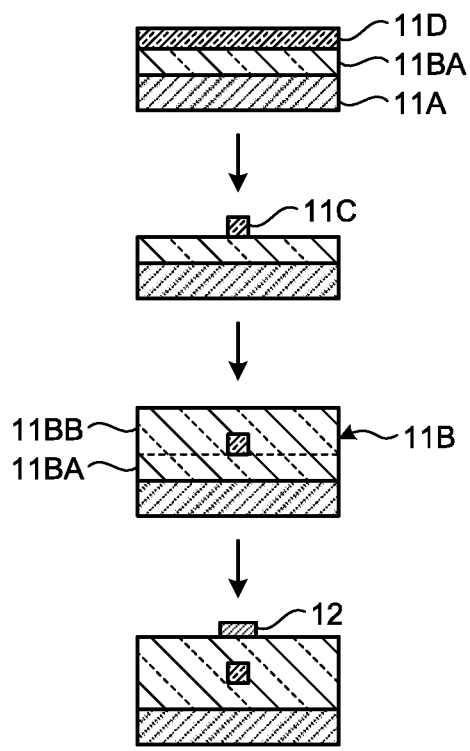
FIG. 4A is a schematic cross-sectional view illustrating an example of steps from film formation of a lower cladding layer to patterning of a heater layer, of a method for manufacturing an optical waveguide circuit device.

Next, in step S103, the optical waveguide formation layer 11D is patterned into the pattern of the optical waveguides 11C by photolithography technology and etching to form the optical waveguides 11C (see FIG. 4A). The etching is carried out by, for example, dry etching using a fluorine-based gas (e.g., $CF_4$) used for a process of processing silica-based glass.

Next, in step S104, an overcladding portion 11BB is formed in such a manner as to cover the lower cladding layer 11BA and the optical waveguides 11C, and thus the cladding layer 11B composed of the lower cladding layer 11BA and the overcladding portion 11BB is formed (see FIG. 4A). The overcladding portion 11BB may be formed by, for example, depositing fine particles including silica-based glass by using a known FHD method, in such a manner as to cover the lower cladding layer 11BA and the optical waveguides 11C and heating and melting the deposited fine particles into transparent glass.

Next, in step S105, a metal material to be formed into the heaters 12 is film-formed on the surface of the cladding layer 11B and thus a heater layer is formed, and in step S106, the heater layer is patterned, and thus the heaters 12 are formed (see FIG. 4A).

Figure 4B:
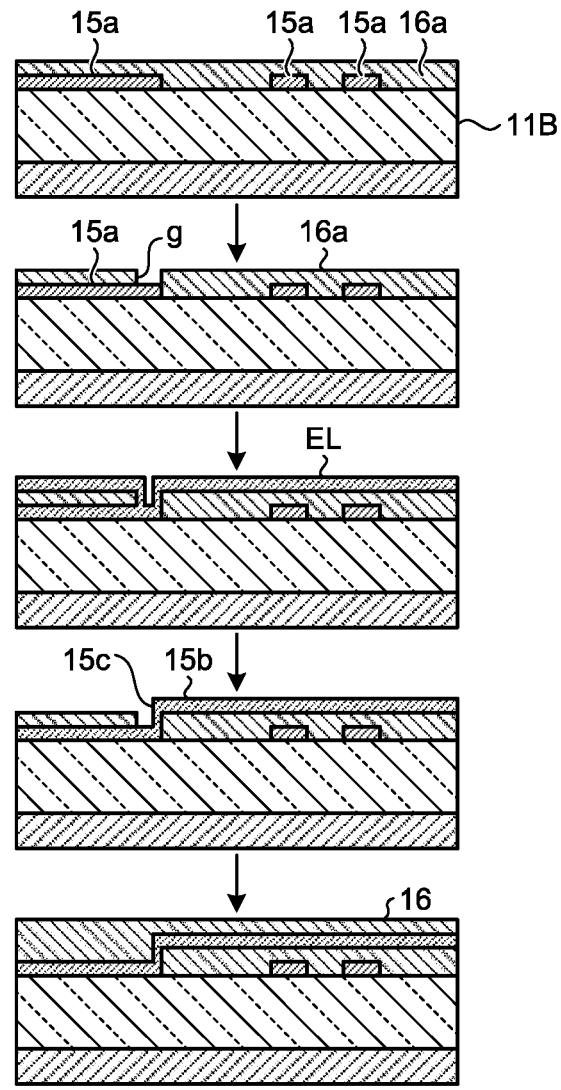
FIG. 4B is a schematic cross-sectional view illustrating an example of steps from formation of an electrode layer to formation of an insulating layer, of a method for manufacturing an optical waveguide circuit device.
Figure 4C:
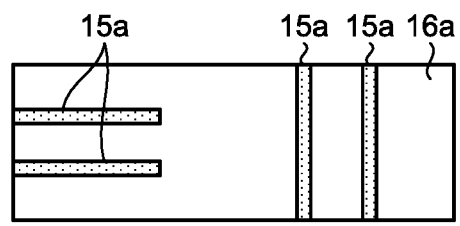
FIG. 4C is a schematic plan view illustrating an example of steps of formation and patterning of an electrode layer, of a method for manufacturing an optical waveguide circuit device.

Next, in step S107, a metal material to be formed into the wiring line electrode layers 15a is film-formed on the surface of the cladding layer 11B and thus an electrode layer is formed, and in step S108, the electrode layer is patterned and thus the wiring line electrode layers 15a are formed (see FIGS. 4B and 4C). Next, in step S109, an insulating layer 16a is formed to cover the major surface of the cladding layer 11B and the wiring line electrode layers 15a (see FIGS. 4B and 4C).

Next, in step S110, the insulating layer 16a is patterned and thus a pattern for forming the wiring line electrode layers 15b and 15c is formed. Specifically, grooves g are formed in the surface of the insulating layer 16a so that an end of each of predetermined wiring line electrode layers 15a is exposed (see FIG. 4B).

Next, in step S111, a metal material to be formed into the wiring line electrode layers 15b and 15c is film-formed on the surface of the cladding layer 11B and thus an electrode layer EL is formed (see FIG. 4B), and in step S112, the electrode layer EL is patterned, and excess of the electrode layer is lifted off or etched and thus the wiring line electrode layers 15b and 15c are formed (see FIG. 4B).

Next, in step S113, a determination is made as to whether a predetermined layer number of wiring layers are formed. In the first embodiment, the predetermined layer number is two, and thus a determination that formation of a predetermined layer number is accomplished is made (step S113, Yes), and the process proceeds to step S114. Note that in the case that an additional wiring layer is to be formed, a determination that formation of a predetermined layer number has yet to be accomplished is made (step S113, No), and the process returns to step S109.

Figure 4D:
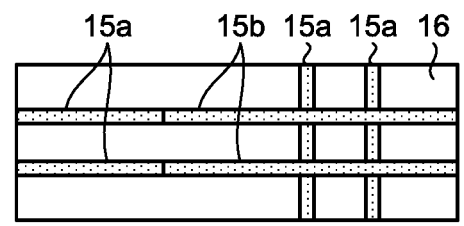
FIG. 4D is a schematic plan view illustrating an example of steps from patterning of an electrode layer to formation of an insulating layer, of a method for manufacturing an optical waveguide circuit device.
Figure 5:
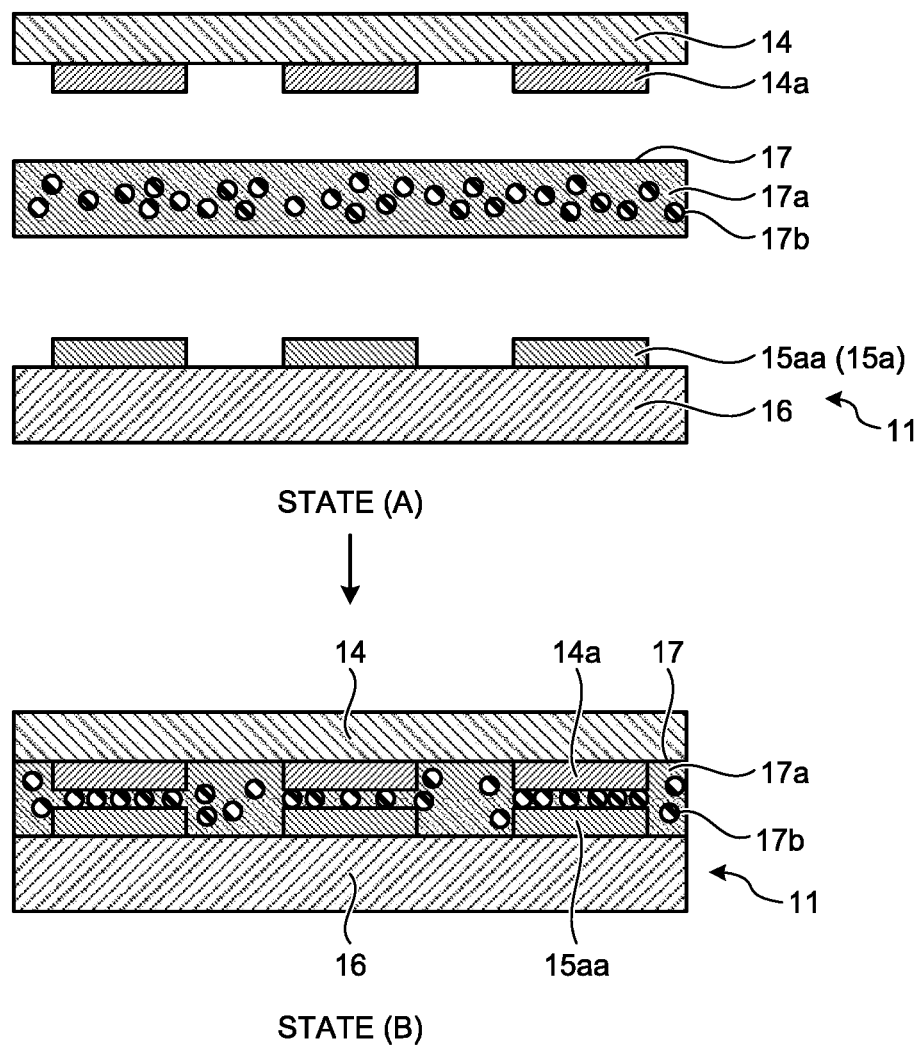
FIG. 5 is a schematic cross-sectional view illustrating an example of a method for coupling wiring line electrode layers to wiring boards.

Next, in step S114, an insulating layer is formed to cover the insulating layer 16a and the wiring line electrode layers 15b and 15c, and thus the insulating layer 16 is obtained (see FIGS. 4B and 4D). Subsequently, in step S115, a part of the portion corresponding to the electrode pad region 13 in the insulating layer 16 (see FIG. 1) are etched, and thus ends of the wiring line electrode layers 15a and 15b are exposed to serve as electrode pads, and in step S116, the wiring line electrode layers 15a and 15b are coupled to the wiring boards 14 (see FIG. 1). Thus, the step is terminated.

A coupling of the wiring line electrode layers 15a and 15b to the wiring boards 14 will be described with reference to FIG. 5 and FIGS. 6A to 6D. FIG. 5 and FIGS. 6A to 6D are views illustrating a coupling in the first embodiment. Note that in FIG. 5, wiring line electrode layers 15a alone, of the wiring line electrode layers 15a and 15b, are illustrated. When coupling is performed, the PLC 11 and the wiring boards 14 are positioned in such a manner that, in the electrode pad region 13 (see FIG. 1), electrode pad portions 15aa, exposed from the insulating layer 16, of the wiring line electrode layers 15a and electrodes 14a of the wiring boards 14 face each other, as in a state (A) illustrated in FIG. 5, and an anisotropic conductive film (ACF) 17 is placed between the PLC 11 and the wiring board 14. The anisotropic conductive film 17 includes an adhesive 17a in a film form and electrically conductive particles 17b dispersed therein. The adhesive 17a includes, for example, a thermosetting epoxy resin or acrylic resin. The electrically conductive particles 17b include, for example, metal particles or particles obtained by coating a resin with an electrically conductive material.

Next, while heat is being applied, pressure is applied in a direction in which the PLC 11 and the wiring boards 14 are brought closer to each other. Thus, the PLC 11 and the wiring boards 14 are bonded to each other via the anisotropic conductive film 17, as in a state (B), illustrated in FIG. 5. As a result, the electrically conductive particles 17b are disposed between the electrode pad portions 15aa and the electrodes 14a. Since the electrically conductive particles 17b are in contact with the electrode pad portions 15aa and the electrodes 14a at the same time, electrical connection between the electrode pad portions 15aa and the electrodes 14a is ensured.

Note that the outermost periphery of the electrically conductive particle 17b may be coated with an insulating layer that can be broken by pressure. In such a case, when the electrically conductive particles 17b are sandwiched between the electrode pad portions 15aa and the electrodes 14a, the insulating layer is broken by pressure and electrical conductivity is produced, and thus electrical connection is established exclusively between the electrode pad portions 15aa, and the electrodes 14a and the insulation is maintained in the remaining portions. As a result, the occurrence of unintentional short-circuiting is inhibited more effectively. Note that in place of the anisotropic conductive film 17, an Anisotropic Conductive Paste (ACP) including a paste adhesive and electrically conductive particles dispersed therein may also be used.

Figure 6A:
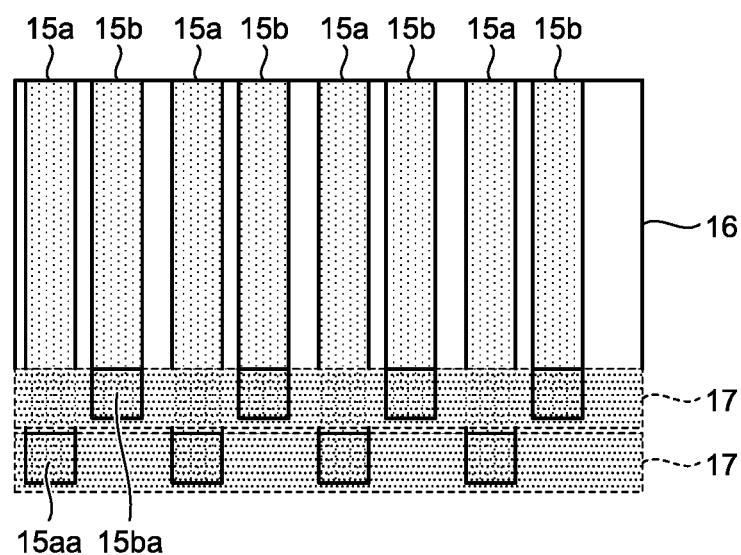
FIG. 6A is a schematic plan view illustrating coupling between wiring line electrode layers and wiring boards.
Figure 6B:
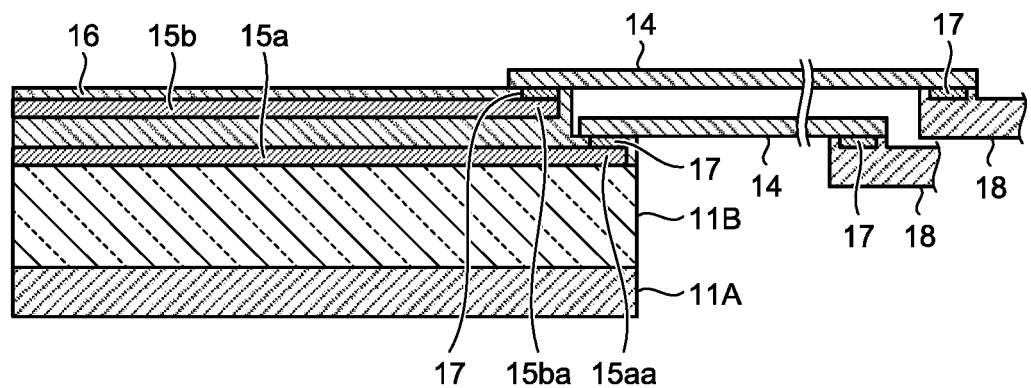
FIG. 6B is a schematic cross-sectional view illustrating an example of a configuration of coupling between wiring line electrode layers and wiring boards.
Figure 6C:
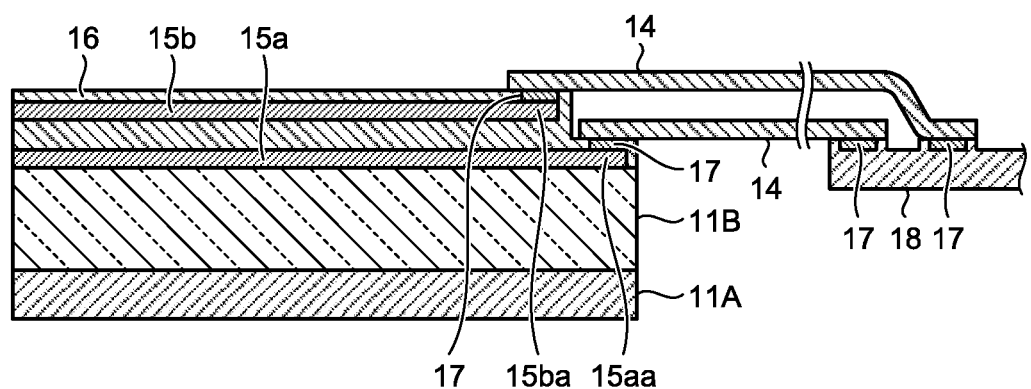
FIG. 6C is a schematic cross-sectional view illustrating another example of a configuration of coupling between wiring line electrode layers and wiring boards.
Figure 6D:
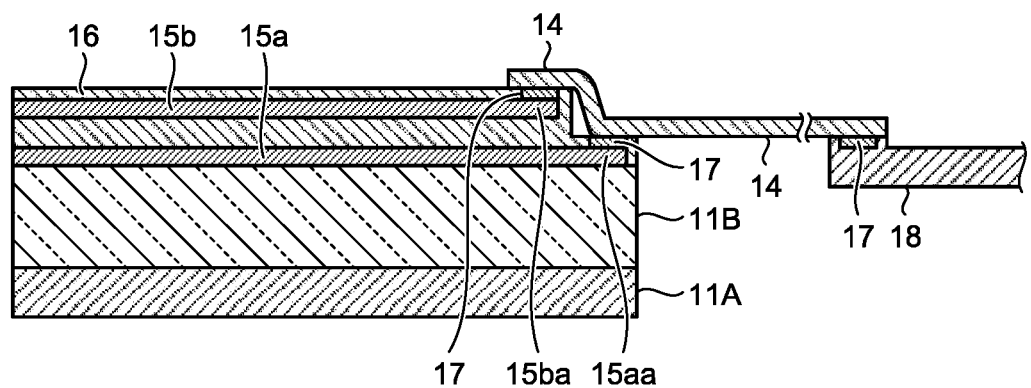
FIG. 6D is a schematic cross-sectional view illustrating still another example of a configuration of coupling between wiring line electrode layers and a wiring board.

In the first embodiment, one of the two wiring boards 14 is coupled to the wiring line electrode layers 15a and the other of the two wiring boards 14 is coupled to the wiring line electrode layers 15b. As illustrated in FIGS. 6A and 6B, the anisotropic conductive film 17 is placed between the electrodes of the one of the wiring boards 14 and the electrode pad portions 15aa at ends of the wiring line electrode layers 15a and also between the electrodes of the other of the wiring boards 14 and electrode pad portions 15ba at ends of the wiring line electrode layers 15b, and bonding is carried out. Thus, electrical connection is ensured between the electrodes of the one of the wiring boards 14 and the electrode pad portions 15aa and between the electrodes of the other of the wiring boards 14 and the electrode pad portions 15ba. Note that in FIG. 6B, the two wiring boards 14 are each coupled to a different electronic substrate 18 with the anisotropic conductive film 17 therebetween. Instead, as illustrated in FIG. 6C, both of the two wiring boards 14 may be coupled to one electronic substrate 18 with the anisotropic conductive film 17 therebetween. Note that the electronic substrate 18 is a substrate configured to supply, to the wiring boards 14, electrical power to be fed to the heaters 12. The electronic substrate 18 may be provided with a controller. The number of wiring boards 14 used may not be two and, as illustrated in FIG. 6D, one wiring board 14 may be bent and coupled to both the electrode pad portions 15aa and 15ba.

Second Embodiment

Figure 7:
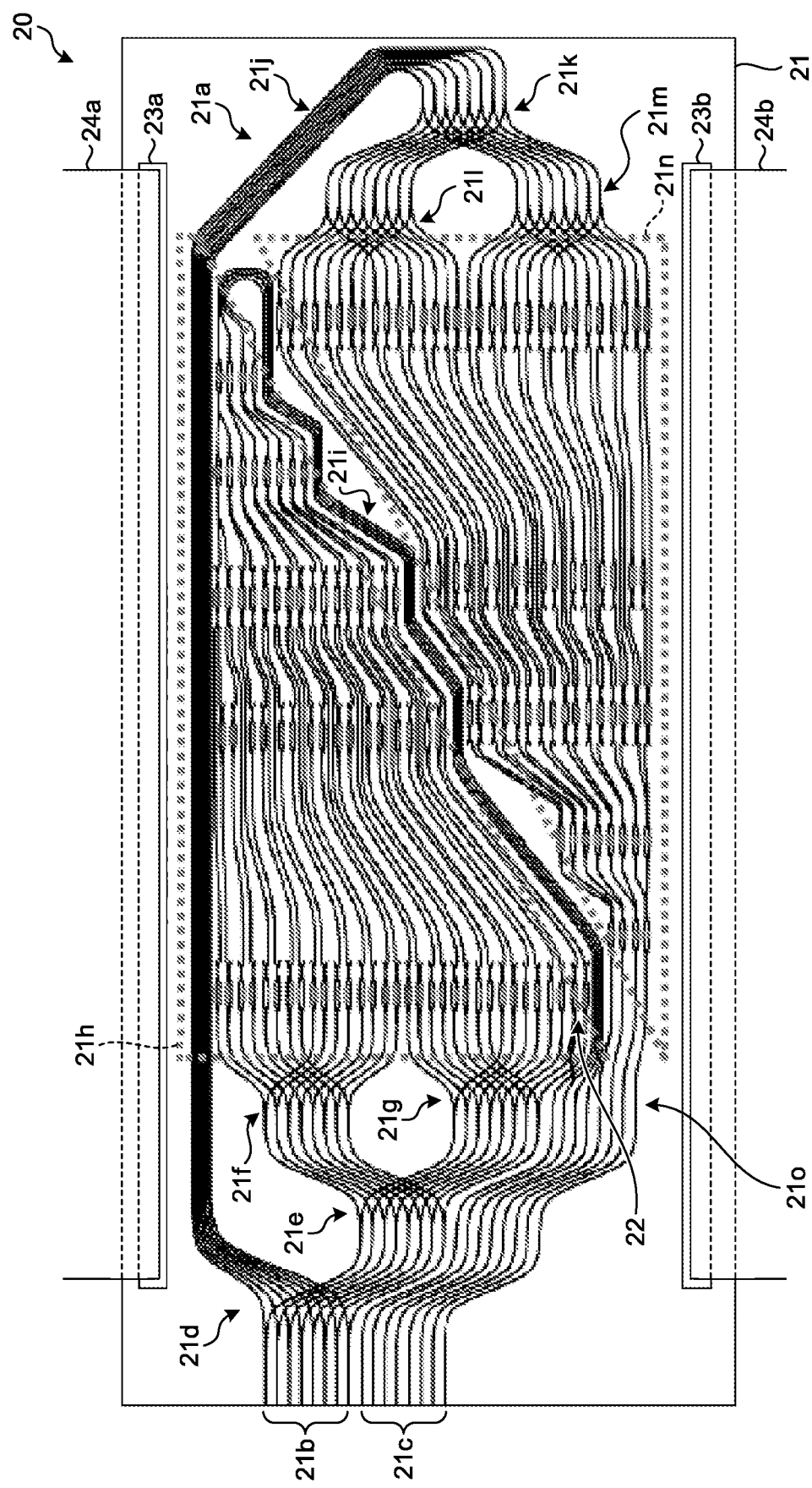
FIG. 7 is a schematic configuration diagram of an optical waveguide circuit device according to a second embodiment.

FIG. 7 is a schematic configuration diagram of an optical switch device that is an optical waveguide circuit device according to a second embodiment. The optical switch device 20 includes a PLC 21, a plurality of heaters 22, electrode pad regions 23a and 23b, and wiring boards 24a and 24b. The PLC 21 is an optical waveguide circuit. An optical switch circuit 21a configured to function as a 4-arrayed 8×1 optical switch circuit is formed in the PLC 21. The optical switch circuit 21a includes eight optical input ports 21b and eight optical output ports 21c.

The eight optical input ports 21b are coupled to respective input ports of eight respective 2-branch couplers 21d. First output ports of the 2-branch couplers 21d are coupled to respective input ports of eight respective 2-branch couplers 21e. First output ports of the 2-branch couplers 21e are coupled to respective input ports of eight respective 2-branch couplers 21f. Second output ports of the 2-branch couplers 21e are coupled to respective input ports of eight respective 2-branch couplers 21g. Output ports of the 2-branch couplers 21f and 21g, thirty-two output ports in total, are coupled to respective branch ports of an arrayed optical switch section 21h having a configuration in which four optical switch circuits 11a illustrated in FIG. 1 are coupled together in parallel. Four common ports of the arrayed optical switch section 21h are coupled to four respective ones of the optical output ports 21c with four respective coupling waveguides 21i therebetween.

On the other hand, second output ports of the 2-branch couplers 21d are coupled to respective input ports of eight respective 2-branch couplers 21k with eight respective coupling waveguides 21j therebetween. First output ports of the 2-branch couplers 21k are coupled to respective input ports of eight respective 2-branch couplers 21l. Second output ports of the 2-branch couplers 21k are coupled to respective input ports of eight respective 2-branch couplers 21m. Output ports of the 2-branch couplers 21l and 21m, thirty-two output ports in total, are coupled to respective branch ports of an arrayed optical switch section 21n having a configuration in which four optical switch circuits 11a illustrated in FIG. 1 are coupled together in parallel. Four common ports of the arrayed optical switch section 21n are coupled to the remaining four respective ones of the optical output ports 21c with four respective coupling waveguides 210 therebetween.

In the optical switch circuit 21a, the two arrayed optical switch sections 21h and 21n are positioned such that one is rotated 180 degrees relative to the other, and as a result, the optical waveguide formation region is small.

The configurations of the PLC 21, the heaters 22, the wiring line electrode layers, the insulating layers, the electrode pad regions 23a and 23b, and the wiring boards 24a and 24b, of the optical switch device 20, are similar to the corresponding configurations of the optical switch device 10 of the first embodiment, and thus a description thereof is omitted.

In addition, in the optical switch device 20, the number of heaters 22 is eighty-eight, which is four times the number of heaters 12 of the optical switch device 10. Furthermore, in the optical switch device 20, the number of wiring line electrode layers is one hundred seventy-six, which is four times the number of wiring line electrode layers of the optical switch device 10.

In the optical switch device 20, too, there are two wiring layers, wiring line electrode layers formed in the different respective wiring layers are adjacent to one another in a plan view, and in either of the wiring layers, the spacing between adjacent wiring line electrode layers is greater than or equal to a predetermined distance. As a result, the wiring line electrode layers are densely arranged without reducing the width of the wiring line electrode layers or reducing the spacing between adjacent wiring line electrode layers. In addition, wiring line electrode layers formed in different wiring layers can be crossed three-dimensionally so that the size of the wiring line electrode layer formation region can be reduced. As a result, the size of the wiring line electrode layer formation region can be miniaturized while ensuring the amount of electrical power supplied and manufacturability, and thus the downsized optical switch device 20 can be achieved. Note that the optical switch device 20 can be produced by a method similar to that for the optical switch device 10.

Note that in the embodiments described above, the number of the wiring layers is two. Instead, the number may be three or greater. When three or greater wiring layers are provided, the size of the wiring line electrode layer formation region is further miniaturized.

Figure 11A:
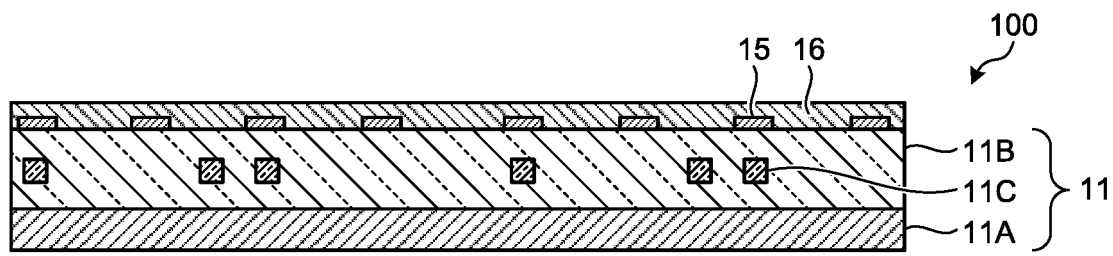
FIG. 11A is a schematic cross-sectional view illustrating an example of a configuration of an optical waveguide circuit device according to the comparative embodiment.
Figure 11B:
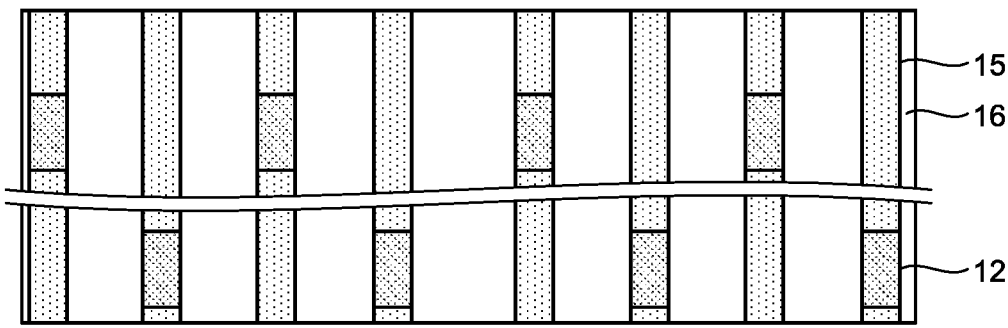
FIG. 11B is a schematic partial plan view of an optical waveguide circuit device according to the comparative embodiment.

Next, a comparison is made between the size of the optical switch device of the second embodiment and the size of an optical switch device of a comparative embodiment illustrated in FIGS. 11A and 11B. In the optical switch device 100 of the comparative embodiment, the configurations of the PLC 11 and the insulating layer 16 were the same as those of the optical switch device 20 of the second embodiment and a 4-arrayed 8×1 optical switch circuit was configured, but all the wiring line electrode layers 15 were formed on the surface of the cladding layer 11B. That is, the number of wiring layer was one.

Figure 8A:
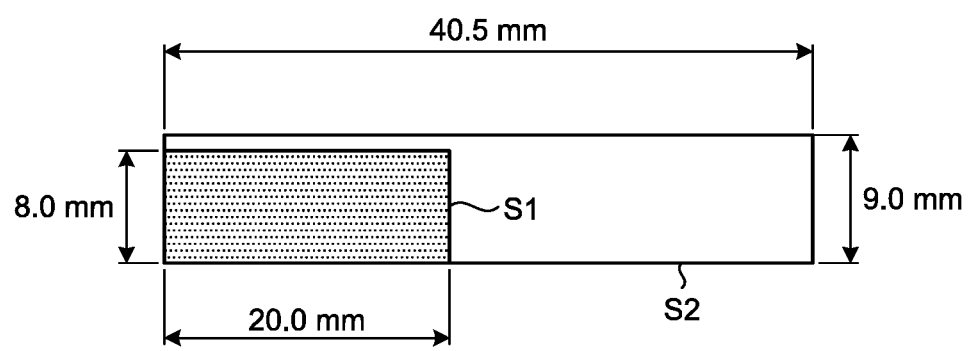
FIG. 8A is a diagram illustrating the size of an optical waveguide circuit device according to a comparative embodiment.
Figure 8B:
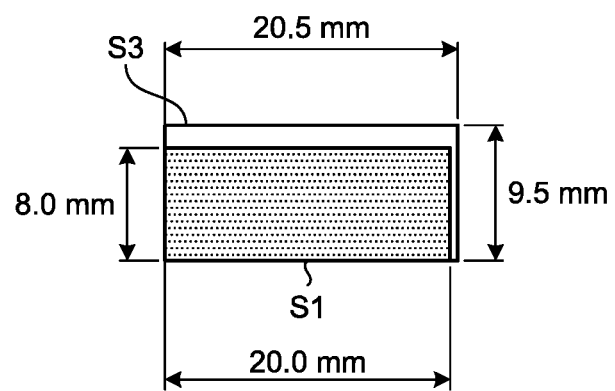
FIG. 8B is a diagram illustrating the size of an optical waveguide circuit device according to the second embodiment.

Here, the optical waveguides 11C were made from silica-based glass doped with $ZrO_2$ and had a relative refractive index difference $\Delta$ with respect to the cladding layer 11B of 5%. With regard to the heaters 12 and 22, the number of heaters to be driven was one hundred seventy-six, the number of electrode pads for heaters, including electrode pads for ground terminals of heaters, was approximately two hundred, and (width of the wiring line electrode layers)/(spacing between adjacent wiring line electrode layers) was 100 μm/100 μm (i.e. the pitch of the wiring line electrode layers is 200 μm). As a result, as illustrated in FIGS. 8A and 8B, for both the second embodiment and the comparative embodiment, an example of the size of an optical waveguide formation region S1 was 20.0 mm×8.0 mm. Furthermore, in the comparative embodiment, an example of the size of a wiring line electrode layer formation region S2 was 40.5 mm×9.0 mm as illustrated in FIG. 8A, whereas in the second embodiment, an example of the size of a wiring line electrode layer formation region S3 was 20.5 mm×9.5 mm as illustrated in FIG. 8B. Thus, it was observed that employing the configuration of the second embodiment results in a significant miniaturization.

Figure 9A:
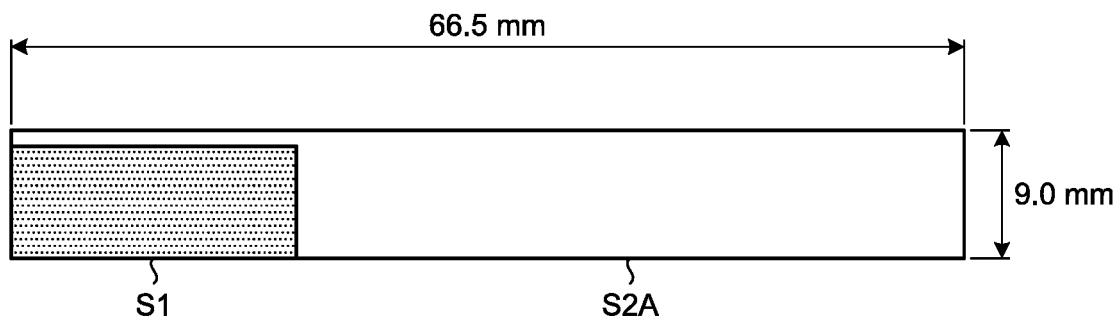
FIG. 9A is a diagram illustrating an example of the size of a wiring line electrode layer formation region of an optical waveguide circuit device according to the comparative embodiment.
Figure 9B:
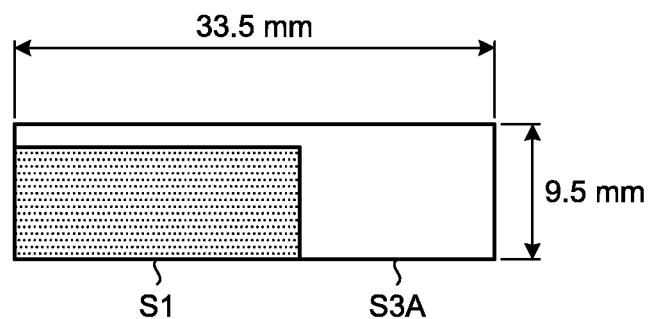
FIG. 9B is a diagram illustrating an example of the size of a wiring line electrode layer formation region of an optical waveguide circuit device according to the second embodiment.
Figure 9C:
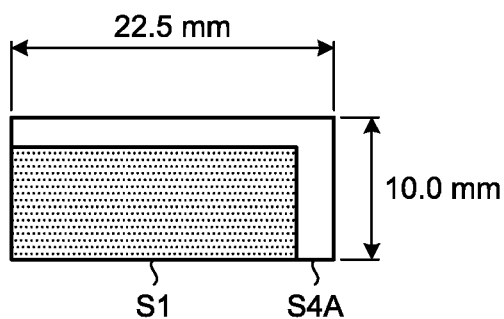
FIG. 9C is a diagram illustrating another example of the size of a wiring line electrode layer formation region of an optical waveguide circuit device according to the second embodiment.

In the second embodiment, in each of the MZIs that form the gate switch, a heater is provided only for one of the arm waveguides. Instead, the configuration may be such that heaters are provided for both the arm waveguides of the MZIs that form the gate switch, and electrical power can be supplied to the heaters. With such a configuration, even when a shift due to a manufacturing error occurs in the phase difference of light provided by both the arm waveguides, an adjustment can be made to obtain a maximum extinction ratio by supplying electrical power to both the heaters and heating the heaters. As a result, the manufacturing yield can be improved. In the case of such a configuration, the number of heaters to be driven is three hundred and four, and the number of electrode pads for the heaters including electrode parts for ground terminals of the heaters is approximately three hundred and thirty. In the case of such a configuration, in the comparative embodiment, an example of the size of a wiring line electrode layer formation region S2A was 66.5 mm×9.0 mm as illustrated in FIG. 9A, whereas in the second embodiment, an example of the size of a wiring line electrode layer formation region S3A was 33.5 mm×9.5 mm as illustrated in FIG. 9B. Thus, it was observed that employing the configuration of the second embodiment results in a significant miniaturization. Furthermore, it was observed that, when three wiring layers are provided, the size of a wiring line electrode layer formation region S4A of the second embodiment was able to be miniaturized to 22.5 mm×10.0 mm as illustrated in FIG. 9C.

Figure 10A:
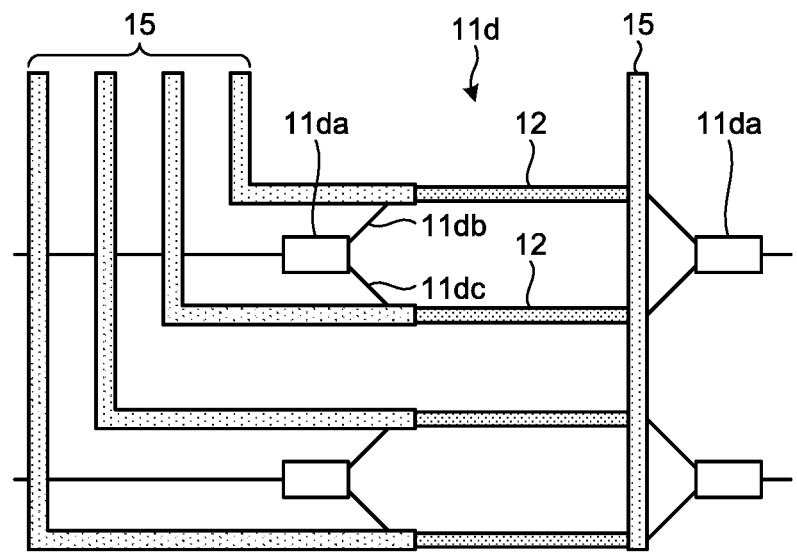
FIG. 10A is a diagram illustrating an example of a configuration of wiring line electrode layers.
Figure 10B:
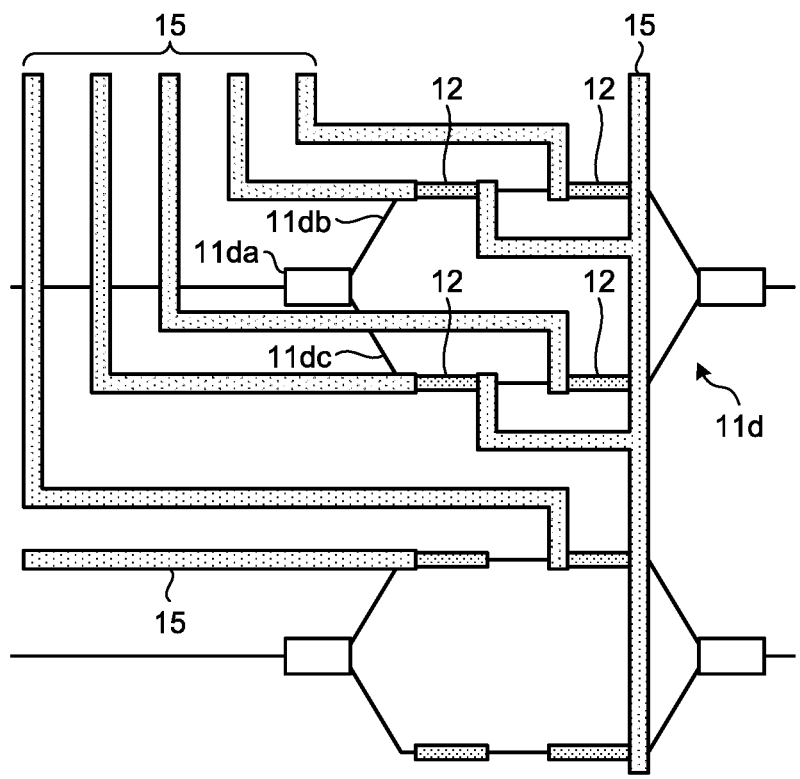
FIG. 10B is a diagram illustrating another example of a configuration of wiring line electrode layers.

Note that in the embodiments described above, in the case that heaters 12 are provided for both the arm waveguides 11db and 11dc of the MZI 11d, one heater 12 may be provided for each of the arm waveguides 11db and 11dc as illustrated in FIG. 10A. However, as illustrated in FIG. 10B, two heaters 12 may also be provided for each of the arm waveguides 11db and 11dc and these heaters may be coupled together in parallel with the wiring line electrode layers 15. With this configuration, the resistance value of the individual heaters 12 is reduced, and as a result, the voltage to be applied can be a low voltage. Note that in the case that such a configuration as illustrated in FIG. 10B is employed, the number of heaters 12 increases, and thus the number of necessary wiring line electrode layers 15 also increases. By employing the multi-wiring layer configuration of one or more embodiments of the present disclosure in order to address the above, the number of heaters 12 can be increased without significantly enlarging the wiring line electrode layer formation region or while maintaining the size unchanged.

Note that the present disclosure is not limited to the embodiments described above. Configurations obtained by combining any of the constituent elements described above are also encompassed by the present disclosure. Furthermore, additional effects and modified examples can be easily derived by those skilled in the art. Thus, more extensive embodiments of the present disclosure are not limited to the embodiments described above, and various changes may be made.

As described above, the optical waveguide circuit device according to one or more embodiments of the present disclosure is useful as an optical switch used in optical communication and in particular is suitable for a miniaturization of the device as a whole.

With one or more embodiments of the present disclosure, the size of the wiring line electrode layer formation region can be miniaturized while ensuring the amount of electrical power supplied and manufacturability. This provides an effect of allowing a downsized optical waveguide circuit device to be achieved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical waveguide circuit device comprising:
   an optical waveguide circuit including
      a cladding layer formed on a substrate and made from silica-based glass, and
      an optical waveguide formed within the cladding layer and made from silica-based glass;
   a plurality of heaters formed over the cladding layer and over the optical waveguide and configured to heat the optical waveguide;
   a plurality of wiring line electrodes formed over the cladding layer, each of the plurality of wiring line electrodes being coupled to a corresponding heater of the plurality of heaters and configured to allow electrical power to be supplied to the corresponding heater; and
   an insulating layer covering the cladding layer, the plurality of heaters, and the plurality of wiring line electrodes,
   wherein the plurality of wiring line electrodes are formed in any of a plurality of wiring layers, a distance between the substrate and each of the plurality of wiring layers is different,
   two adjacent wiring line electrodes of the plurality of wiring line electrodes in a plan view are each formed in different wiring layers of the plurality of wiring layers, and
   two adjacent wiring line electrodes of the plurality of wiring line electrodes in a same wiring layer of the plurality of wiring layers are spaced by at least a predetermined distance.

2. The optical waveguide circuit device according to claim 1, wherein a relative refractive index difference Δ of the optical waveguide to the cladding layer is 3% or greater.

3. The optical waveguide circuit device according to claim 2, wherein the optical waveguide is doped with zirconia ($ZrO_2$).

4. The optical waveguide circuit device according to claim 1, wherein each of the plurality of wiring line electrodes includes an end not coupled to any of the plurality of heaters and exposed from the insulating layer, and the optical waveguide circuit device further includes a wiring board coupled to the exposed end of the plurality of wiring line electrodes with an anisotropic conductive film or an anisotropic conductive paste between the wiring board and the end.

5. An optical waveguide circuit device comprising:

an optical waveguide circuit including
- a cladding layer formed on a substrate and made from silica-based glass, and
- an optical waveguide formed within the cladding layer and made from silica-based glass;

a plurality of heaters formed over the cladding layer and over the optical waveguide and configured to heat the optical waveguide;

a plurality of wiring line electrodes formed over the cladding layer, each of the plurality of wiring line electrodes being coupled to a corresponding heater of the plurality of heaters and configured to allow electrical power to be supplied to the corresponding heater;

an insulating layer covering the cladding layer, the plurality of heaters, and the plurality of wiring line electrodes, wherein the plurality of wiring line electrodes being formed in any of a plurality of wiring layers having distances from the substrate different from one another, wiring line electrode layers of the plurality of wiring line electrodes adjacent to each other in a plan view are each formed in different wiring layers of the plurality of wiring layers, and wiring line electrode layers of the plurality of wiring line electrodes adjacent to each other in the same wiring layer of the plurality of wiring layers are spaced by at least a predetermined distance, each of the plurality of wiring line electrodes including an end not coupled to any of the plurality of heaters and exposed from the insulating layer; and a wiring board coupled to the exposed end of the plurality of wiring line electrodes with an anisotropic conductive film or an anisotropic conductive paste between the wiring board and the end.

* * * * *